(12) United States Patent
Yokota et al.

(10) Patent No.: US 11,184,460 B2
(45) Date of Patent: Nov. 23, 2021

(54) SERVER DEVICE AND TRANSFER DEVICE FOR CONTENT DISTRIBUTION SYSTEM

(71) Applicant: KDDI CORPORATION, Tokyo (JP)

(72) Inventors: Kenji Yokota, Fujimino (JP); Jun Kurihara, Fujimino (JP); Atsushi Tagami, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 55 days.

(21) Appl. No.: 16/263,719

(22) Filed: Jan. 31, 2019

(65) Prior Publication Data

US 2019/0166225 A1 May 30, 2019

Related U.S. Application Data

(63) Continuation of application No. PCT/JP2017/031743, filed on Sep. 4, 2017.

(30) Foreign Application Priority Data

Sep. 21, 2016 (JP) .............................. JP2016-184651
Sep. 21, 2016 (JP) .............................. JP2016-184652

(51) Int. Cl.
*H04L 29/08* (2006.01)
*H04L 12/00* (2006.01)
(Continued)

(52) U.S. Cl.
CPC ............ *H04L 67/327* (2013.01); *G06F 13/00* (2013.01); *H04L 12/00* (2013.01);
(Continued)

(58) Field of Classification Search
CPC ... H04L 67/327; H04L 12/00; H04L 12/2816; H04L 12/4625; H04L 45/306;
(Continued)

(56) References Cited

U.S. PATENT DOCUMENTS 8,386,622 B2  2/2013  Jacobson
2002/0143984 A1* 10/2002 Michel ................ H04L 67/2842
                                                    709/238
(Continued)

FOREIGN PATENT DOCUMENTS

EP    2120419 A2   11/2009
EP    2816783 A1   12/2014
(Continued)

OTHER PUBLICATIONS

Partial European Search Report for European Patent Application No. 17852811.3 dated Jul. 9, 2019.
(Continued)

*Primary Examiner* — Philip J Chea
*Assistant Examiner* — Robert B McAdams
(74) *Attorney, Agent, or Firm* — Thomas | Horstemeyer, LLP (57) ABSTRACT

A transfer device includes: a determination unit configured to determine, if a data packet including content and list information is received as a response to a transferred request packet, whether or not the content can be transmitted to a transfer device that has transmitted the request packet, based on an identifier of the transfer device that has transmitted the request packet and the list information. The list information included in the data packet is generated based on an identifier of a transfer device to which the content included in the data packet can be transmitted, of a plurality of transfer devices in the content distribution system, or is generated based on an identifier of a transfer device to which the content included in the data packet cannot be transmitted.

9 Claims, 7 Drawing Sheets

(51) Int. Cl.
*G06F 13/00* (2006.01)
*H04L 12/46* (2006.01)
*H04L 12/28* (2006.01)
*H04L 12/725* (2013.01)
*H04L 29/06* (2006.01)

(52) U.S. Cl.
CPC ...... *H04L 12/2816* (2013.01); *H04L 12/4625* (2013.01); *H04L 45/306* (2013.01); *H04L 65/4076* (2013.01); *H04L 65/4084* (2013.01); *H04L 67/2842* (2013.01)

(58) Field of Classification Search
CPC .............. H04L 65/4076; H04L 65/4084; H04L 67/2842; G06F 13/00
See application file for complete search history.

(56) References Cited

U.S. PATENT DOCUMENTS

| | | | | |
|---|---|---|---|---|
| 2005/0083936 A1* | 4/2005 | Ma | ...................... | H04L 47/2408 370/392 |
| 2009/0049237 A1* | 2/2009 | Sivakumar | .......... | G06F 12/0813 711/113 |
| 2013/0018937 A1* | 1/2013 | Kim | .................... | G06F 16/9574 709/202 |
| 2013/0227166 A1* | 8/2013 | Ravindran | .......... | H04L 67/2833 709/238 |
| 2016/0087876 A1* | 3/2016 | Fan | ........................ | H04L 45/14 709/242 |

FOREIGN PATENT DOCUMENTS

| | | |
|---|---|---|
| EP | 2928117 A1 | 10/2015 |
| JP | 2009-277234 A | 11/2009 |
| JP | 2015-233269 A | 12/2015 |
| JP | 2016-149714 A | 8/2016 |
| WO | 2018/056032 A1 | 3/2018 |

OTHER PUBLICATIONS

Tantatsanawong et al., Improving Big Data on Research and Education Networks Using Future Internet Approach: A Case Study of Networks Analysis, 2015 12th International Conference on Electrical Engineering/Electronics, Computer, Telecommunications and Information Technology (ECTI-CON), IEEE, Jun. 24, 2015, pp. 1-5, XP033197047, DOI: 10 .1109/ECTICON. 2015. 7207133 [retrieved on Aug. 17, 2015].

International Search Report for PCT/JP2017/031743 dated Nov. 21, 2017 (partially translated).

Jacobson et al., "Networking Named Content", CoNEXT 2009, Dec. 1-4, 2009, Rome, Italy.

* cited by examiner

| CONTENT NAME | INTERFACE |
|---|---|
| /A/B | IF#1 |

FIG. 5

| CONTENT NAME | INTERFACE |
|---|---|
| /A/B | NULL |

| CONTENT NAME | INTERFACE |
|---|---|
| /A | IF#1 |

SERVER DEVICE AND TRANSFER DEVICE FOR CONTENT DISTRIBUTION SYSTEM

CROSS-REFERENCE TO RELATED APPLICATIONS

This application is a continuation of International Patent Application No. PCT/JP2017/031743 filed on Sep. 4, 2017, which claims priority to and the benefit of Japanese Patent Application No. 2016-184651 filed on Sep. 21, 2016 and Japanese Patent Application No. 2016-184652 filed on Sep. 21, 2016, the entire disclosures of which are incorporated herein by reference.

TECHNICAL FIELD

This disclosure relates to a server device and a transfer device for a content distribution system that performs routing based on a content name.

BACKGROUND ART

A content distribution system has been proposed in which content is requested and distributed based on a name that indicates the content. Patent Document 1 and Non-Patent Document 1 disclose content centric networking (CCN), which is a type of such a system.

CITATION LIST

Patent Literature

PTL1: Japanese Patent Laid-Open No. 2009-277234

Non-Patent Literature

NPTL1: V. Jacobson, et al., "Networking Named Content", in Proceedings of ACM CoNEXT 2009, December 2009

SUMMARY OF INVENTION

Technical Problem

In the CCN, a server device that publishes content divides this content into one or more objects that are called chunks, and a client device acquires the content according to the divided objects. Also, in the CCN, a communication device that transfers the objects (hereinafter, "transfer device") can save (cache) the objects. Upon receiving, from a client device, an interest packet (request packet) for requesting the cached objects, the transfer device can transmit the cached objects to the client device that has transmitted the interest packet, without transferring the interest packet to the server device.

An example of operations of the transfer device will be described below. The transfer device manages a CS (Contents Store), an FIB (Forward Information Base), and a PIT (Pending interest Table). The CS refers to information indicating the objects cached in the transfer device. The FIB refers to information indicating a relationship between an object requested by the interest packet and an interface to which the interest packet is to be transferred. The PIT refers to information indicating a relationship between an object requested by a transferred interest packet and an interface that has received the transferred interest packet.

Upon receiving an interest packet, the transfer device searches the CS and determines whether or not the object requested by the interest packet is cached in the transfer device. If the requested data is cached, the transfer device transmits a data packet that includes the object cached therein to the client device that has transmitted the interest packet. Note that the interface that is to transmit this data packet is an interface that has received the interest packet. On the other hand, if the object requested by the received interest packet is not cached, the transfer device searches the PIT and determines whether or not the transfer device has already transferred an interest packet that requests the same object as that requested by the received interest packet, and the transfer device is currently in a state of waiting for receiving the object. If the transfer device is in the waiting state, the transfer device does not transfer the received interest packet, and updates the PIT so as to associate the interface that has received the interest packet with the object requested by the interest packet. On the other hand, if the transfer device is not in a state of waiting for receiving the object requested by the received interest packet, the transfer device transfers the interest packet from an interface determined based on the FIB, and updates the PIT. Also, upon receiving a data packet that includes the object, the transfer device determines, based on the PIT, an interface to which the object is to be transferred, transfers the object to the determined interface, and deletes information regarding this object from the PIT. Note that the interface to which the object is to be transferred is the interface that has received the interest packet that requests the object. Also, the transfer device updates the CS after caching the received and transferred object.

Thus, in the CCN, a data packet that includes an object is transmitted from an interface that has received an interest packet that requests this object. For this reason, the object is transferred reversely through the same path as that of the interest packet that requests the object, and is distributed to a client device that has requested the object. The interest packet includes information (object name) that indicates the requested object, but does not include information for specifying the client device that has transmitted the interest packet. Accordingly, the server device and the transfer devices that distribute a cached object cannot recognize the area or the network in which the client device that has requested the object is located.

Meanwhile, in content distribution using the current Internet, an IP address of a client device that requests content is set for an IP packet for requiring the content. Thus, a server device that distributes content can determine the area and/or the network in which the client device that has requested the content is located, based on the IP address of the client device that has requested the content. Accordingly, the server device can perform control to determine, in advance, areas, e.g. countries, to which each piece of content can be distributed, distribute requested content if a client device that has requested the content is located in the areas to which this content can be distributed, and not distribute the content if the client device that has requested the content is not located in the areas to which this content can be distributed.

Solution to Problem

According to an aspect of the present invention, a transfer device for a content distribution system, in which a request packet including a content name of content that is requested to be distributed is transferred based on the content name, includes: a determination unit configured to determine, if a data packet including content and list information is received as a response to a transferred request packet, whether or not the content can be transmitted to a transfer device that has transmitted the request packet, based on an identifier of the transfer device that has transmitted the request packet, and on the list information; and a communication unit configured to transmit the data packet to the transfer device that has transmitted the request packet, if the determination unit determines that the content can be transmitted, wherein the list information included in the data packet is generated based on an identifier of a transfer device to which the content included in the data packet can be transmitted, of a plurality of transfer devices in the content distribution system, or is generated based on an identifier of a transfer device to which the content included in the data packet cannot be transmitted.

Advantageous Effects of Invention

According to the present invention, destinations to which content is to be distributed can be controlled in a content distribution system, in which the content is transferred based on a content name.

Further features and advantages of the present invention will become apparent from the following description with reference to the attached drawings. Note that, in the attached drawings, the same or similar constituents are assigned the same reference numerals.

DESCRIPTION OF EMBODIMENTS

Hereinafter, exemplary embodiments of the present invention will be described with reference to the drawings. Note that the following embodiments are examples, and are not intended to limit the present invention to the content of the embodiments. Constituent elements that are not needed in the description of the embodiments are omitted from the following diagrams. Note that the embodiments of the present invention will be described below, based on a premise that the content distribution system is a CCN. However, the present invention is applicable to content distribution systems in which a transfer device performs routing based on a content name, and thus, the area or the network in which a client device that has requested content is located cannot be immediately determined based on a packet that requests the content.

First Embodiment

Figure 1:
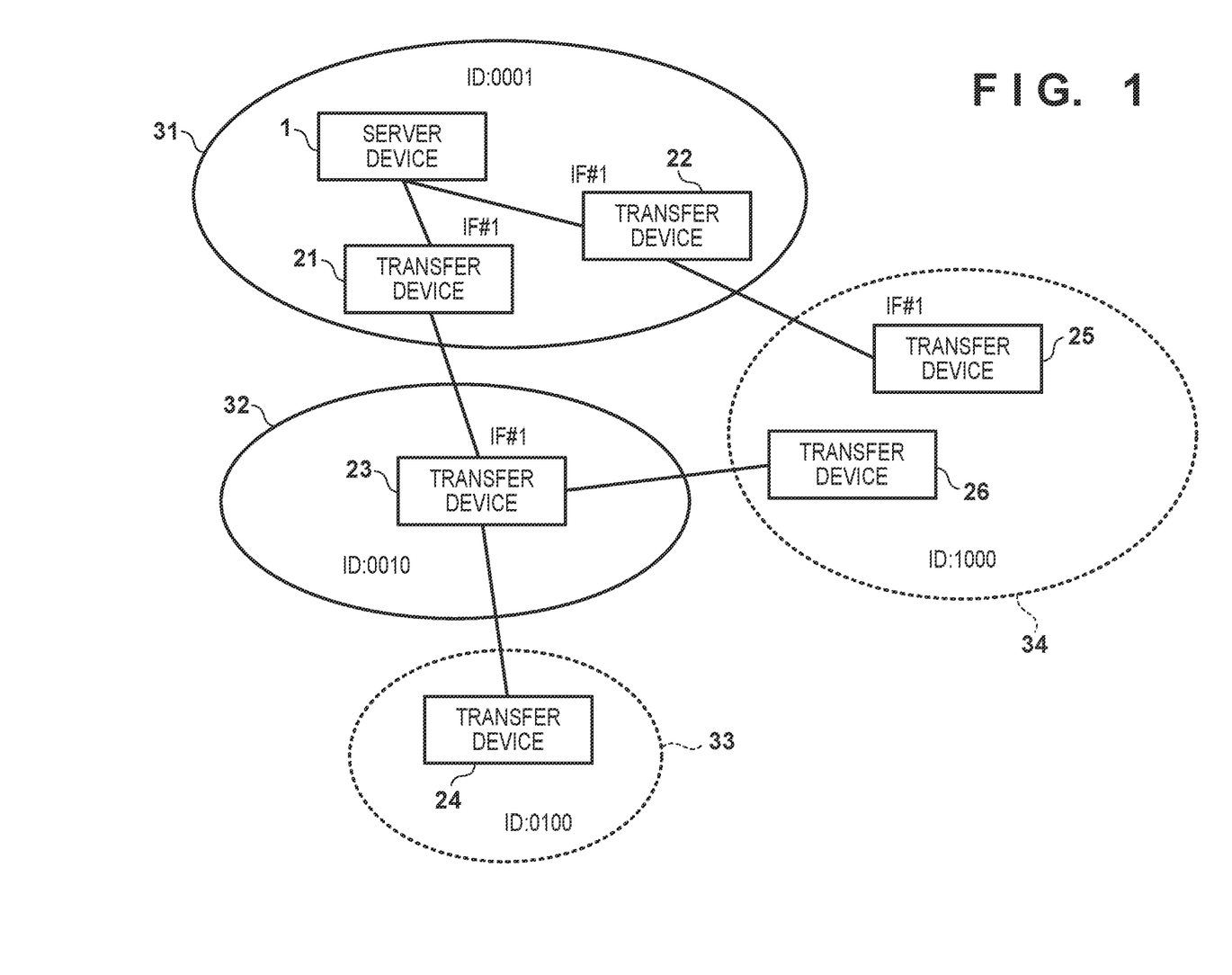
FIG. 1 is a configuration diagram of a content distribution system according to an embodiment.

FIG. 1 is a configuration diagram of a content distribution system according to this embodiment. In FIG. 1, the content distribution system includes four networks 31, 32, 33, and 34. For example, the networks can be distinguished from each other according to operators that operate the networks. Also, the networks can be distinguished from each other according to predetermined areas, such as countries. In other words, a network that contains client devices located in a predetermined area can be considered as a single network. In the present invention, distribution control is performed while setting, for each network, whether or not content can be transmitted thereto. In the configuration in FIG. 1, the network 31 includes a transfer device 21, a transfer device 22, and a server device 1, the network 32 includes a transfer device 23, the network 33 includes a transfer device 24, and the network 34 includes transfer devices 25 and 26. Note that FIG. 1 only shows transfer devices that connect the networks to each other. That is to say, a plurality of transfer devices that are not shown in the diagram may be included in each network. Also, although FIG. 1 only shows a single server device 1, server devices that are not shown in the diagram may be included in the networks 31 to 34.

A description will be given below of a case of performing control such that content held in the server device 1 can be distributed to the networks 31 and 32, but cannot be distributed to the networks 33 and 34. For this reason, in this embodiment, an identifier (ID) is assigned to each network. In FIG. 1, "0001" is assigned to the network 31, "0010" is assigned to the network 32, "0100" is assigned to the network 33, and "1000" is assigned to the network 34. Thus, in this embodiment, identifiers are assigned in which the bit value in one position in a bit string is differentiated from the bit value in the other positions. Since there are four networks in the example in FIG. 1, four-bit identifiers are assigned thereto. According to the identifier assigning method in this embodiment, the number of digits of each identifier is greater than or equal to the number of networks.

The transfer devices 21 to 26 hold the identifiers of the networks to which the respective transfer devices pertain. That is to say, for example, the transfer device 21 holds the identifier "0001", and the transfer device 25 holds the identifier "1000". In the following description, the identifier of the network to which each transfer device pertains, the identifier being held by this transfer device, is also called the identifier of this transfer device. The transfer devices exchange, through communication, the set identifiers with transfer devices that are directly connected thereto via links. Accordingly, the transfer device 22 recognizes that the identifier of the transfer device 25 is "1000", and the transfer device 25 recognizes that the identifier of the transfer device 22 is "0001". Thus, the plurality of transfer devices in the content distribution system are grouped by the networks, and transfer devices in the same group are assigned the same identifier.

Furthermore, networks to which content can be transmitted (distributed) are designated on the server device 1 by a user. Upon the networks to which the content can be transmitted being designated by the user, the server device 1 obtains the bitwise logical sum (OR) of the identifiers of the designated networks. In this example, the networks 31 and 32 are designated as the networks to which the content can be transmitted, and thus, the bitwise logical sum of the identifiers of the networks is "0011". This value indicates all of the networks to which the content can be transmitted, in the form of an identifier, and will be called "distributability list information" below.

It is assumed that a client device that pertains to the network 34 has transmitted an interest packet that requests an object of the content held in the server device 1, and this interest packet has been transmitted to the server device 1 via the transfer device 25 and the transfer device 22. In this case, the server device 1 transmits a data packet that includes the requested object to the transfer device 22, and the server device 1 includes the distributability list information in the data packet. The transfer device 22, upon receiving the data packet from the server device 1, recognizes that the destination to which the received data packet is to be transferred is the transfer device 25, based on a PIT. Subsequently, the transfer device 22 obtains the bitwise logical product (AND) of the distributability list information included in the data packet and the identifier of the transfer device 25. In this example, the distributability list information is "0011", the identifier of the transfer device 25 is "1000", and accordingly, the operation result is "0000". If all of the bit values in the operation result are 0, the transfer device 22 determines that the object included in the received data packet cannot be transmitted to the transfer device 25. That is to say, the transfer device 22 determines that the transfer device 25 is included in a network to which the object is not permitted to be distributed. Accordingly, the transfer device 22 discards the received data packet, and does not transfer the object to the transfer device 25. Thus, distribution of the content to an unpermitted area or network can be prevented.

Meanwhile, it is assumed that the transfer device 21 has received an interest packet from the transfer device 23 and transferred the received interest packet, and has received, from the server device 1, a data packet that includes an object requested by the interest packet, as a response to the transferred interest packet. The distributability list information is "0011", the identifier of the transfer device 23 is "0010", and accordingly, the result of the operation performed by the transfer device 21 is "0010". Since not all of the bit values in the bit string of the operation result are 0, the transfer device 21 transfers the received data packet to the transfer device 23. If a client device that has transmitted the interest packet is a device in the network 32, this data packet is ultimately distributed to this client device. Meanwhile, it is assumed that the client device that has transmitted the interest packet is a device in the network 33. In this case, the transfer device 23 recognizes that the destination to which the data packet is to be transferred is the transfer device 24. However, since the distributability list information is "0011" and the identifier of the transfer device 24 is "0100", the operation result is "0000", and the transfer device 23 discards the data packet without transmitting the data packet to the transfer device 24.

Also, the transfer device determines whether or not to cache the object included in the received data packet based on a predetermined criteria, regardless of whether the transfer device has transferred or discarded the received data packet. Note that the predetermined criteria can be whether or not a memory prepared for caching has available space. Furthermore, if the memory has no available space, whether or not to cache the object can be determined based on already-cached objects, and the priority of the object included in the received data packet, for example. After caching the object included in the received data packet, the transfer device adds information indicating this object to a CS. At this time, the transfer device adds, to the CS, the distributability list information included in the received data packet in association with this object.

For example, it is assumed that the transfer device 23 has cached an object. It is also assumed that the transfer device 23 has received, from the transfer device 26, an interest packet that requests the cached object. In a normal CCN, the transfer device 23 transmits a data packet that includes the cached object to the transfer device 26. However, in this embodiment, the transfer device 23 obtains the bitwise logical product of the distributability list information associated with the cached object and the identifier of the transfer device 26 to determine whether or not the cached object can be transmitted to the transfer device 26. In this example, all of the bits in the result of the logical product are 0, and accordingly, the transfer device 23 does not transmit the cached object requested by the received interest packet to the transfer device 26. Note that, if the cached object can be transmitted, the transfer device 23 generates a data packet that includes the cached object and the distributability list information associated with this object, and transmits the generated data packet to the transfer device that has transmitted the interest packet.

The above configuration makes it possible to control the destination to which content is to be distributed. In the above embodiment, although only one bit in each identifier is "1" and the other bits are "0", conversely, an identifier in which only one bit is "0" and the other bits are 1 can be used. In this case, the server device 1 obtains the bitwise logical product of the identifiers of networks to which content can be distributed, and uses the resultant value as the distributability list information. Each transfer device obtains the bitwise logical sum of the distributability list information and the identifier of a transfer device that is a transfer destination, determines that content cannot be transmitted if all of the bits are 1, and determines that the content can be transmitted if not. That is to say, the operations of the logical sum and the logical product in the description of FIG. 1 are reversed. In any case, it is determined that content cannot be transmitted if, as a result of the logical operation of the distributability list information and the identifier of a transfer device, all bits take the same values, and it is determined that the content can be transmitted if not.

Second Embodiment

In the first embodiment, a user designates, on the server device 1, networks to which content can be transmitted, and the server device 1 generates the distributability list information based on the designated networks. In this embodiment, the user designates networks to which content cannot be transmitted, and the server device 1 generates non-distributability list information using the logical sum of the identifiers of the designated networks. Taking the configuration in FIG. 1 as an example, the user designates the networks 33 and 34, and accordingly, the server device 1 generates the non-distributability list information "1100", which is the bitwise logical sum of the identifier "0100" and the identifier "1000".

In this embodiment as well, when transferring a data packet, each transfer device obtains the bitwise logical product of the non-distributability list information and the identifier of a transfer device that is a transfer destination. If not all of the bits in the operation result of the logical product are 0, it is determined that the transfer device that is the transfer destination is located in an area or a network to which the object is not permitted to be distributed, and the object is not transferred. On the other hand, if all of the bits in the operation result of the logical product are 0, it is determined that the transfer device that is the transfer destination is located in an area or a network to which the object is permitted to be distributed, and the object is transferred. For example, it is assumed that a destination to which a data packet that the transfer device 22 has received from the server device 1 is to be transmitted is the transfer device 25. Since the bitwise logical product of the non-distributability list information "1100" and the identifier "1000" of the transfer device 25 is "1000", the transfer device 22 does not transmit the received data packet to the transfer device 25. Meanwhile, it is assumed that the destination to which the data packet that the transfer device 21 has received from the server device 1 is to be transferred is the transfer device 23. The bitwise logical product of the non-distributability list information "1100" and the identifier "0010" of the transfer device 23 is "0000", and in this case, the transfer device 21 transmits the received data packet to the transfer device 23. Note that 0 and 1 in each identifier can also be inverted, similarly to the first embodiment. However, in this embodiment, content can be transmitted if, as a result of the bitwise logical operation of the non-distributability list information and the identifier of a transfer device that is a transmission destination, i.e., the identifier of a transfer device that has transmitted an interest packet, all of the bits take the same value, and the content cannot be transmitted if not, unlike in the first embodiment.

Third Embodiment

Figure 2:
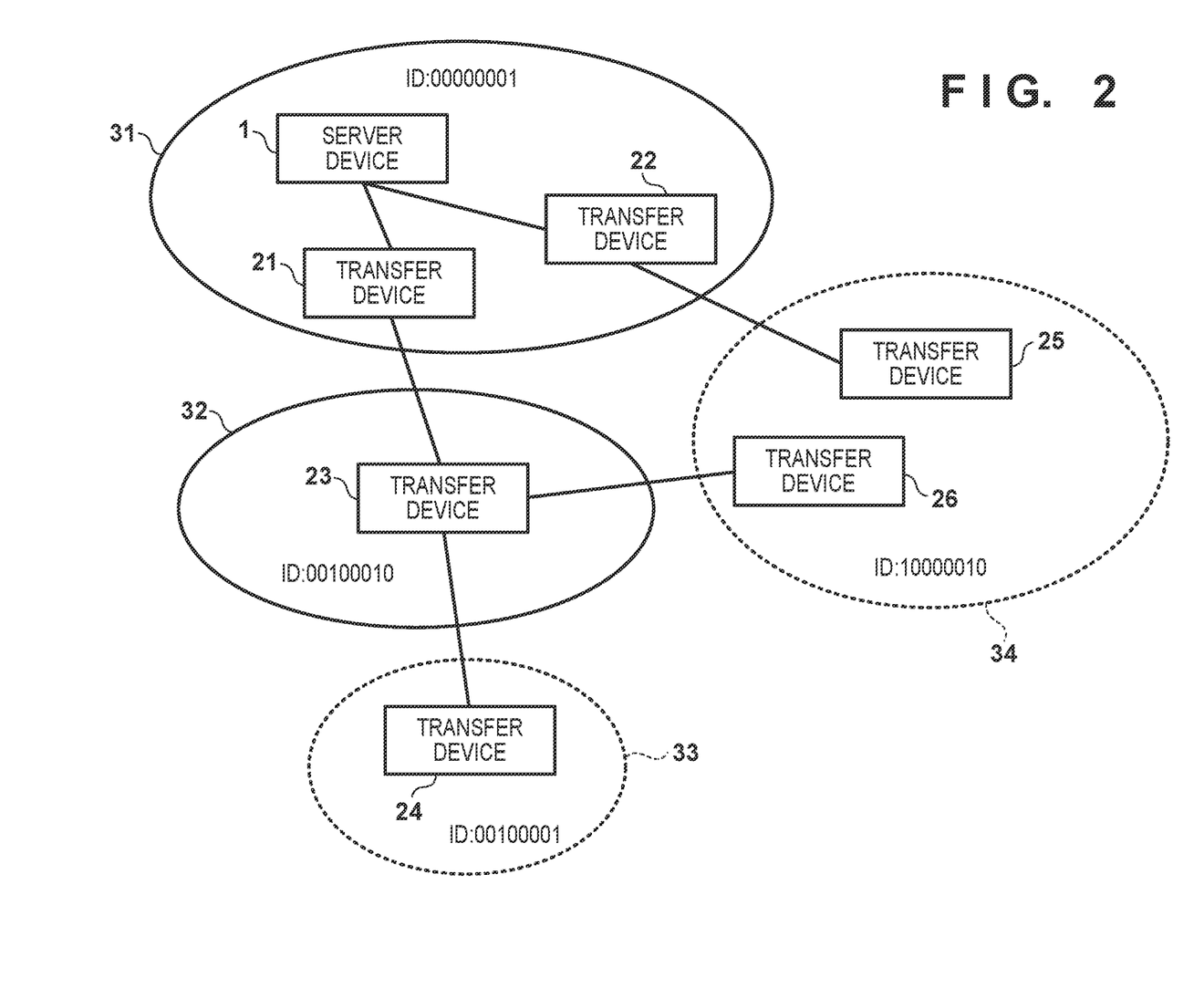
FIG. 2 is a configuration diagram of a content distribution system according to an embodiment.

In the first embodiment and the second embodiment, in the identifier of each network, only one bit in the bit string takes a first value (e.g. "1"), and all of the other bits take a second value (e.g. "0"). Accordingly, the number of digits of each identifier needs to be greater than or equal to the number of networks. In this embodiment, to reduce the number of digits of each identifier, an identifier is used in which one or more bits in the bit string takes the first value (e.g. "1"), and all of the other bits take the second value (e.g. "0"). FIG. 2 shows a network configuration that differs from the network configuration in FIG. 1, only in the identifiers of the networks. Specifically, the network 31 is assigned "00000001", the network 32 is assigned "00100010", the network 33 is assigned "00100001", and the network 34 is assigned "10000010".

Assuming that the distributability list information is generated similarly to the first embodiment, the distributability list information is the bitwise logical sum of "00000001" and "00100010", and is "00100011". Assuming that the transfer device 22 transmits a data packet to the transfer device 25, the transfer device 22 operates the bitwise logical product of the distributability list information "00100011" and the identifier "10000010" of the transfer device 25. In this embodiment, the data packet is transmitted if the operation result coincides with the identifier of the transfer device 25 that is the transmission destination. In this example, the operation result is "00000010", which does not coincide with the identifier "10000010" of the transfer device 25, and accordingly, the transfer device 22 does not transmit the data packet to the transfer device 25.

Meanwhile, assuming that the transfer device 21 transmits a data packet to the transfer device 23, the transfer device 21 operates the bitwise logical product of the distributability list information "00100011" and the identifier "00100010" of the transfer device 23. The operation result is "00100010", which coincides with the identifier of the transfer device 23, and accordingly, the transfer device 21 transmits the data packet to the transfer device 23.

Also, assuming that the transfer device 23 transmits a data packet to the transfer device 24, the transfer device 23 obtains the bitwise logical product of the distributability list information "00100011" and the identifier "00100001" of the transfer device 24. The operation result is "00100001", which coincides with the identifier of the transfer device 24, and accordingly, the transfer device 23 transmits the data packet to the transfer device 24. In this example, a setting is configured so that content cannot be distributed to the network 33, which is an example of an incorrect determination. An incorrect determination does not occur if only one bit in the bit string of each identifier takes the first value (e.g. "1"), and all of the other bits take the second value (e.g. "0"), but occurs if two or more bits take the first value, as in this embodiment. Note that the greater the largest number of bits to take the first value, the higher the probability that an incorrect determination occurs. However, by sufficiently reducing the largest number of bits to take the first value relative to the number of digits of the bit string used as an identifier, the probability that an incorrect determination is made can be reduced so that a practical determination can be performed. In this manner, if a certain degree of incorrect determination is allowed, an identifier can be used in which a predetermined number or less of bits takes the first value, and the remaining bits take the second value.

Note that, in this embodiment as well, non-distributability list information can be used as in the second embodiment. In this case, it is determined that content cannot be transmitted if the result of the bitwise logical operation of the non-distributability list information and the identifier of a transfer device that is a transmission destination coincides with the identifier of the transfer device that is the transmission destination, and it is determined that content can be transmitted if not.

Fourth Embodiment

FIG. 1 is a configuration diagram of a content distribution system according to this embodiment. As shown in FIG. 1, the transfer devices 21 and 22 are connected to the server device 1 via respective interfaces #1(IF #1), the transfer device 23 is connected to the transfer device 21 via an interface #1(IF#1), and the transfer device 25 is connected to the transfer device 22 via an interface #1 (IF #1).

A description will be given below of the case of performing control so that content held in the server device 1 can be distributed to the networks 31 and 32, but cannot be distributed to the networks 33 and 34. For this reason, the identifiers (ID) shown in FIG. 1 are assigned to the respective networks, similarly to the first embodiment. Also, similarly to the first embodiment, the transfer devices 21 to 26 hold the identifiers of the networks to which the respective transfer devices pertain, and the transfer devices exchange, through communication, the set identifiers with the transfer devices that are directly connected thereto via links. In the following description, the identifier of the network to which each transfer device pertains and that is held by the transfer device is also called the identifier of this transfer device. Furthermore, networks to which content can be transmitted (distributed) are designated on the server device 1 by a user. Similarly to the first embodiment, upon the networks to which content can be transmitted being designated by the user, the server device 1 obtains the bitwise logical sum (OR) of the identifiers of the designated networks, i.e. generates the distributability list information. In this example, the networks 31 and 32 are designated as the networks to which the content can be transmitted, and accordingly, the distributability list information is "0011".

Figure 3:
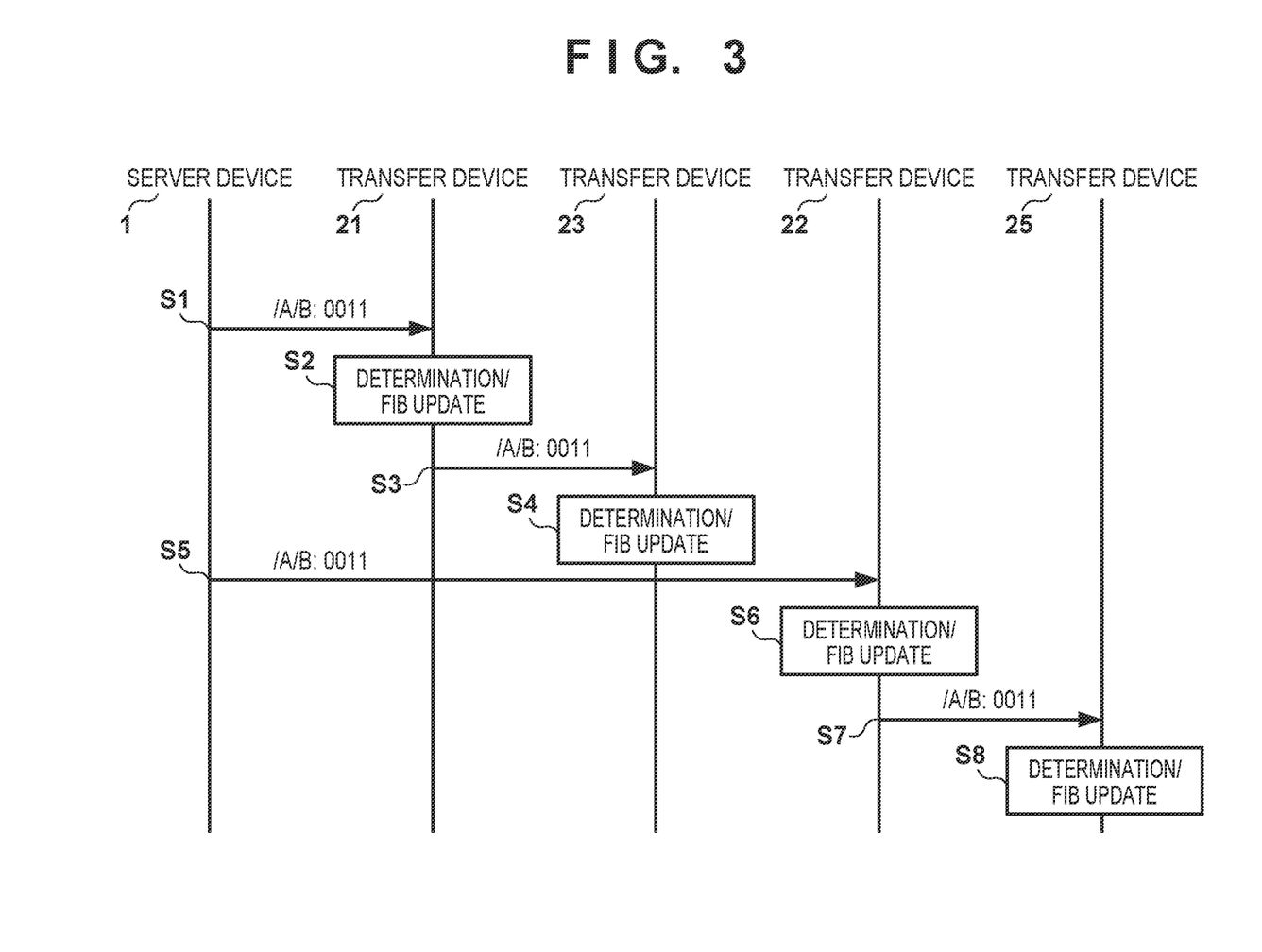
FIG. 3 is a sequence chart of broadcast message distribution according to an embodiment.

The server device 1 transmits a broadcast message that indicates the content that the server device 1 holds to the transfer devices that are connected thereto. The transfer devices update an FIB, which is transfer information, using the broadcast message. Furthermore, the transfer devices transmit the received broadcast message from interfaces other than the interfaces that have received the broadcast message. Thus, when receiving an interest packet, the transfer devices create an FIB for determining an interface for transferring this interest packet. In this embodiment, the distributability list information is included in this broadcast message. FIG. 3 is a sequence chart applied when the server device 1 distributes a broadcast message that indicates that the server device 1 holds content with a content name "/A/B".

In step S1, the server device 1 transmits, to the transfer device 21, a broadcast message that includes information indicating the content name "/A/B" and the distributability list information "0011", and in step S5, the server device 1 transmits the same broadcast message to the transfer device 22. Upon receiving the broadcast message, each of the transfer devices usually updates the FIB so as to set the interface that has received the broadcast message as the interface to which an interest packet that is included in the broadcast message and requests the content name "/A/B" is to be transferred. However, in this embodiment, each of the transfer devices, upon receiving the broadcast message, operates the bitwise logical product of the identifier of this transfer device and the distributability list information included in the broadcast message. If the operation result of the bitwise logical product is not "0000", the transfer device updates the FIB so as to set the interface that has received the broadcast message as the interface to which the interest packet that is included in the broadcast message and requests the content name "/A/B" is to be transferred. On the other hand, if the operation result of the bitwise logical product is "0000", the transfer device updates the FIB so as to set a null value as the interface to which the interest packet that is included in the broadcast message and requests the content name "/A/B" is to be transferred. Note that, in this embodiment, the null value means that the received interest packet is discarded without being transferred.

Figure 4:
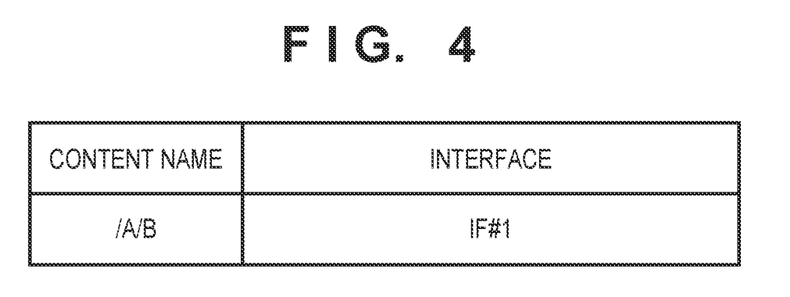
FIG. 4 shows an FIB according to an embodiment.

The identifier of the transfer device 21 is "0001", the distributability list information included in the broadcast message is "0011", and accordingly, the operation result of the bitwise logical product is "0001", i.e. not all of the bits are 0. Thus, in step S2, the transfer device 21 adds an entry shown in FIG. 4 to the FIB. The identifier of the transfer device 22 is the same as the identifier of the transfer device 21, and accordingly, in step S6, the transfer device 22 adds the entry shown in FIG. 4 to the FIB. Also, the transfer devices that have received the broadcast message transmit the received broadcast message from interfaces other than the interfaces that have received this broadcast message. Accordingly, in step S3, the transfer device 21 transmits the broadcast message to the transfer device 23, and in step S7, the transfer device 22 transmits the broadcast message to the transfer device 25.

The identifier of the transfer device 23 is "0010", the distributability list information included in the broadcast message is "0011", and accordingly, the operation result of the bitwise logical product is "0010", i.e. not all of the bits are 0. Thus, in step S4, the transfer device 23 adds the entry shown in FIG. 4 to the FIB. On the other hand, the identifier of the transfer device 25 is "1000", the distributability list information included in the broadcast message is "0011", and accordingly, the operation result of the bitwise logical product is "0000", i.e. all of the bits are 0. Accordingly, in step S8, the transfer device 25 adds an entry shown in FIG. 5 to the FIB.

Figure 5:
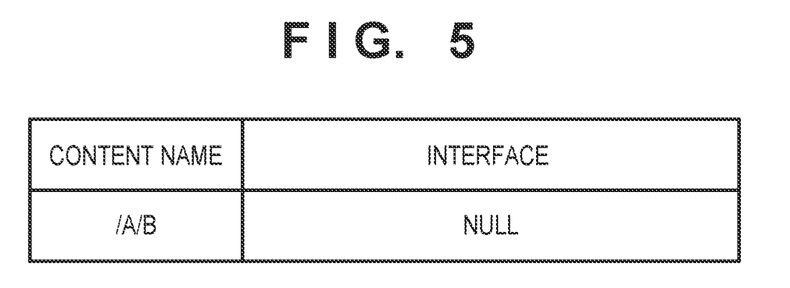
FIG. 5 shows an FIB according to an embodiment.

Accordingly, upon receiving the interest packet that requests the content name "/A/B", the transfer device 25 discards the received interest packet without transferring it, based on the FIB. Thus, the content with the content name "/A/B" can be prevented from being distributed to the network 34. In addition, the number of times that each transfer device transfers interest packets can be reduced.

Although, in this embodiment, only one bit in each identifier is "1" and the other bits are "0", conversely, an identifier can be used in which only one bit is "0" and the other bits are "1". In this case, the server device 1 obtains the bitwise logical product of the identifiers of the networks to which content can be distributed, and uses the resultant value as the distributability list information. Then, each transfer device obtains the bitwise logical sum of the distributability list information and the identifier of this transfer device, sets the null value as a transfer destination interface in the FIB if all of the bits are 1, and adds the interface that has received the broadcast message as the transfer destination interface in the FIB if not. That is to say, the operations of the logical sum and the logical product in the description of FIG. 1 are reversed. In any case, if, as a result of the logical operation of the distributability list information and the identifier of the transfer device, all of the bits take the same value, the null value is set as a transfer destination interface, and adds, if not, the interface that has received the broadcast message as the transfer destination interface.

Furthermore, in this embodiment, the user designates, on the server device 1, networks to which content can be transmitted, and the server device 1 generates the distributability list information based on the designated networks. However, a configuration may alternatively be employed in which the user designates networks to which content cannot be transmitted, and the server device 1 generates non-distributability list information using the logical sum of the identifiers of the designated networks. For example, in the configuration in FIG. 1, the networks 33 and 34 are designated, and thus, the server device 1 generates non-distributability list information "1100", based on the bitwise logical sum of the identifier "0100" and the identifier "1000". Then, the server device includes the non-distributability list information in the broadcast message.

In this case as well, each transfer device obtains the bitwise logical product of the non-distributability list information and the identifier of this transfer device. Then, in this case, if all of the bits in the operation result of the logical product are 0, the transfer devices adds the interface that has received the broadcast message as a transfer destination interface in the FIB, and if not, the transfer devices sets the null value as a transfer destination interface in the FIB. For example, the bitwise logical product of the identifier "0001" of the transfer devices 21 and 22 and the non-distributability list information "1100" is "0000", and accordingly, the transfer devices 21 and 22 add the interface that has received the broadcast message as a transfer destination interface. Also, the bitwise logical product of the identifier "0010" of the transfer device 23 and the non-distributability list information "1100" is "0000", and accordingly, the transfer device 23 adds the interface that has received the broadcast message as a transfer destination interface. On the other hand, the bitwise logical product of the identifier "1000" of the transfer device 25 and the non-distributability list information "1100" is "1000", and accordingly, the transfer device 25 adds the null value as a transfer destination interface. Furthermore, in the case of using the non-distributability list information as well, an identifier can be used in which only one bit is "0", and the other bits are "1".

Fifth Embodiment

Figure 6:
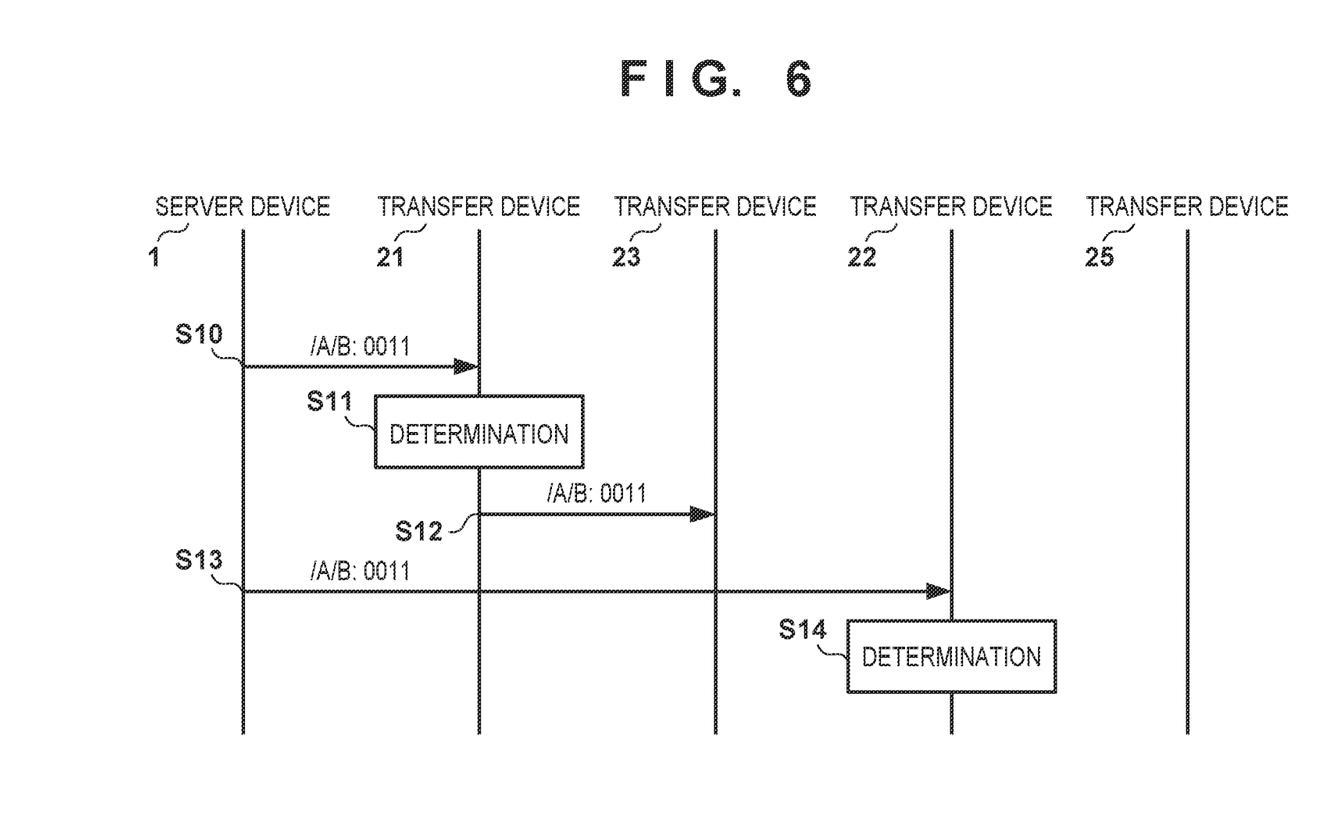
FIG. 6 is a sequence chart of broadcast message distribution according to an embodiment.

In the fourth embodiment, each transfer device performs a logical operation of the distributability list information and the identifier of this transfer device to determine the value to be set as a transfer destination interface in the FIB. In this embodiment, each transfer device, upon receiving a broadcast message, obtains the logical product of the identifier of a transfer device to which this broadcast message is to be transferred and the distributability list information included in the broadcast message, and determines, based on the result of the logical product, whether or not to transfer the broadcast message. FIG. 6 is a sequence chart of broadcast message distribution according to this embodiment.

In step S10, the server device 1 transmits, to the transfer device 21, a broadcast message that includes information indicating the content name "/A/B" and the distributability list information "0011", and in step S13, the server device 1 transmits the same broadcast message to the transfer device 22. In step S11, the transfer device 21 determines whether or not to transmit the broadcast message to the transfer device 23. For this purpose, the transfer device 21 obtains the bitwise logical product of the identifier of the transfer device 23 and the distributability list information included in the broadcast message. In this example, since the operation result is "0010", i.e. not all of the bits are 0, in step S11, the transfer device 21 determines that the broadcast message can be transmitted to the transfer device 23. Accordingly, in step S12, the transfer device 21 transmits the broadcast message to the transfer device 23. Similarly, in step S14, to determine whether or not the broadcast message can be transferred to the transfer device 25, the transfer device 22 obtains the bitwise logical product of the identifier of the transfer device 25 and the distributability list information included in the broadcast message. In this example, since the operation result is "0000", i.e. all of the bits are 0, in step S14, the transfer device 22 determines that the broadcast message cannot be transmitted to the transfer device 25. Note that, upon receiving a broadcast message, each transfer device updates the FIB, similarly to the case of a normal CCN.

As shown in FIG. 6, the transfer device 25 does not receive the broadcast message that indicates the content name "/A/B", and accordingly, information indicating a transfer destination interface in the case of receiving an interest packet that requests the content name "/A/B" is not created in the FIB of the transfer device 25. If a transfer destination cannot be determined based on the FIB, the transfer devices according to this embodiment discard the received interest packet. Accordingly, the content with the content name "/A/B" is not distributed to the network 34 which includes the transfer device 25, and thus, destinations to which content is to be distributed can be controlled.

Figure 7:
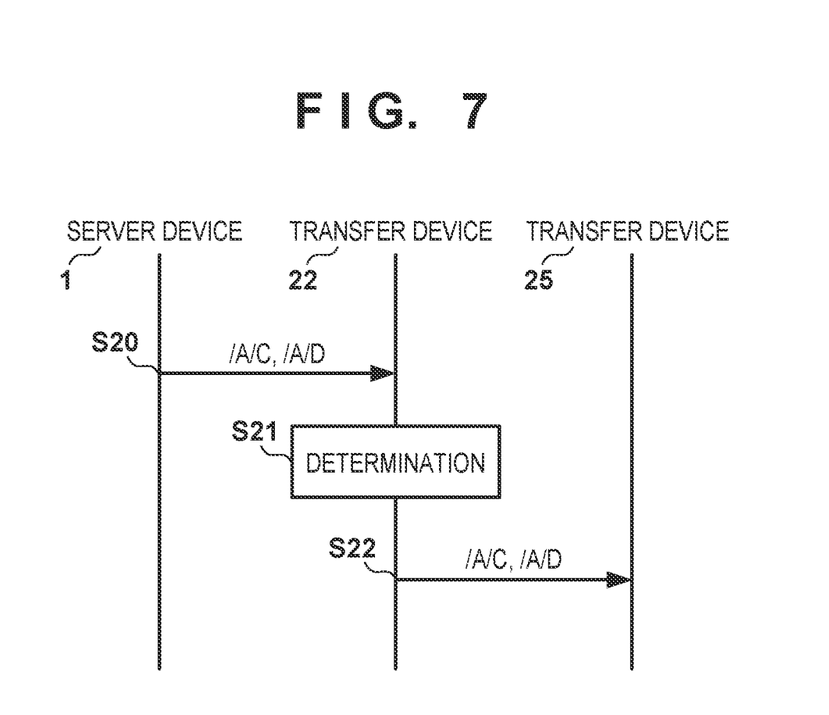
FIG. 7 is a diagram describing restriction on a content name according to an embodiment.
Figure 8:
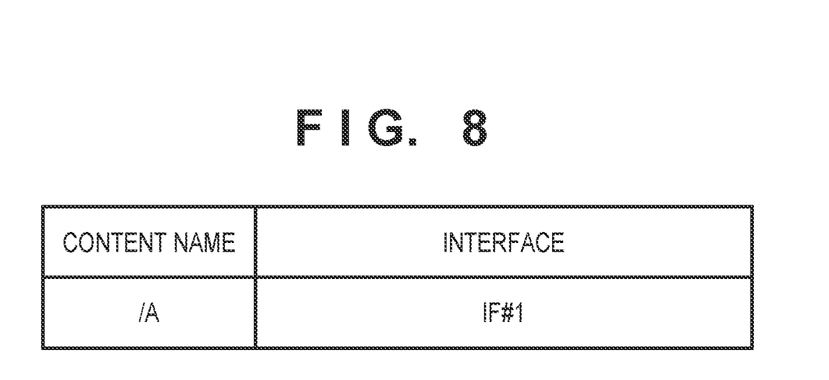
FIG. 8 shows an FIB according to an embodiment.

Note that, in the case of this embodiment, a restriction is placed on the method for assigning a content name. For example, it is assumed that the server device 1 has transmitted a broadcast message with content of which the distribution area is not restricted (content names/A/C and/ A/D), to the transfer device 22 in step S20 prior to step S10, as shown in FIG. 7. In this case, in step S21, the transfer device 22 determines that this broadcast message can be transmitted to the transfer device 25, and accordingly, in step S22, the transfer device 22 transmits the broadcast message to the transfer device 25. The entries in the FIB may indicate transfer destination interfaces for the respective content names. However, to reduce the number of entries, entries in the FIB can be aggregated by a plurality of pieces of content that have a shared prefix and are to be transferred to the same interface. That is to say, the FIB can indicate transfer destination interfaces for the shared prefix. Accordingly, there are cases where the transfer device 25 adds an entry shown in FIG. 8 to the FIB based on the broadcast message received in step S22. In this case, even if it is determined in step S14 in FIG. 6 that the broadcast message received by the transfer device 22 cannot be distributed to the transfer device 25, for example, the transfer device 25 that has received an interest packet that requests the content name "/A/B" will transfer this interest packet to the transfer device 22, rather than discarding the interest packet, based on the FIB shown in FIG. 8. Accordingly, in this embodiment, content of which the distribution destination is restricted is assigned a content name that does not have a prefix portion that is shared with other pieces of content.

Device Configuration

Figure 9:
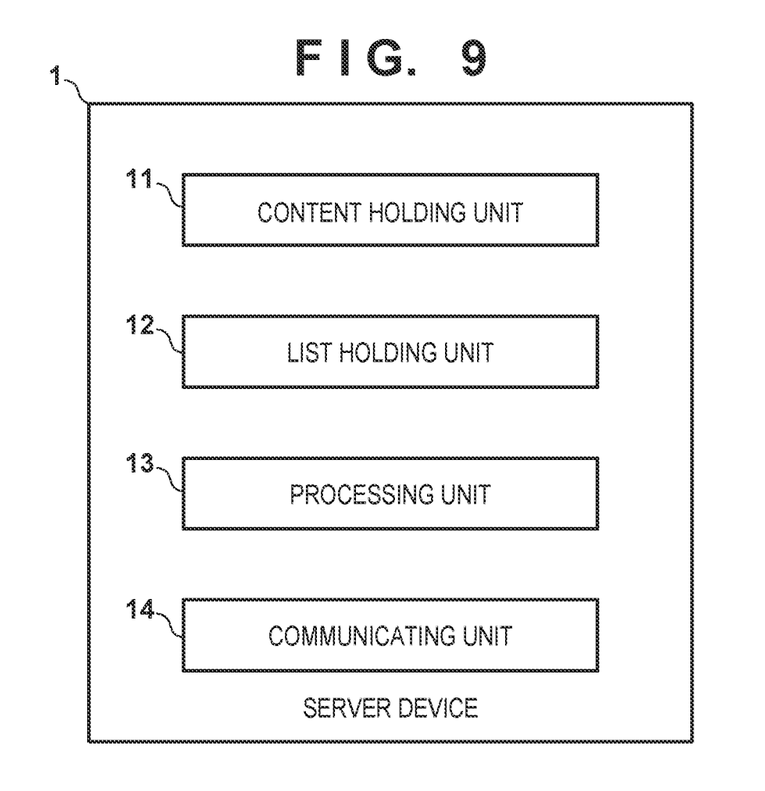
FIG. 9 is a configuration diagram of a server device according to an embodiment.

FIG. 9 is a configuration diagram of the server device 1 according to the above embodiments. A content holding unit 11 holds content to be published. A list holding unit 12 generates and holds distributability list information or non-distributability list information, based on networks to which content can be transmitted or networks to which the content cannot be transmitted that are designated by a user. Note that one piece of the distributability list information or the non-distributability list information may be provided regardless of content, or the distributability list information or the non-distributability list information may be provided for each content. By providing the distributability list information or the non-distributability list information for each content, the networks to which content can be distributed can be controlled for each content. In this case, the user designates networks to which content can be or cannot be distributed, for each content. Note that a user may directly input the distributability list information or the non-distributability list information. In the first embodiment to the third embodiment, a processing unit 13, upon receiving an interest packet via a communicating unit 14, reads out an object requested by the interest packet from the holding unit 11, and generates a data packet. Note that the processing unit 13 includes the distributability list information or the non-distributability list information regarding this content in the data packet. The processing unit 13 then transmits the data packet via the communicating unit 14. In the fourth embodiment and the fifth embodiment, when the processing unit 13 transmits a broadcast message regarding content, the processing unit 13 includes the distributability list information or the non-distributability list information regarding this content in the broadcast message, and transmits this broadcast message via the communicating unit 14.

Figure 10:
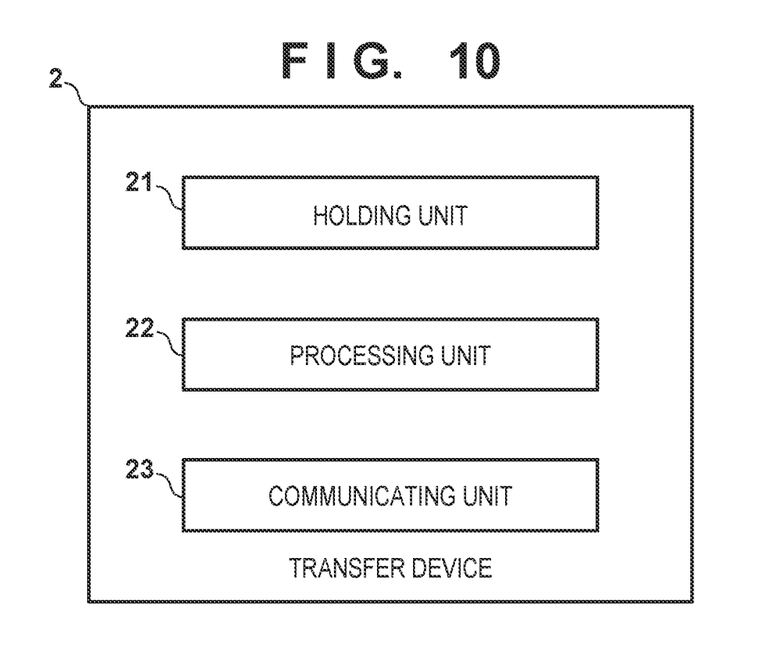
FIG. 10 is a configuration diagram of a transfer device according to an embodiment.

FIG. 10 is a configuration diagram of a transfer device according to the above embodiments. The holding unit 21 holds a CS, a PIT, an FIB, and a cached object. In the first embodiment to the third embodiment, the processing unit 22, upon receiving a data packet via the communicating unit 23, determines an interface to which this data packet is to be transferred, based on the PIT. Next, the processing unit 22 performs a logical operation of the identifier of a transfer device connected to the transfer destination interface and the distributability list information or the non-distributability list information included in the received data packet, and determines whether or not the data packet can be transmitted. If the data packet can be transmitted, the processing unit 22 transmits the data packet from the interface regarding which the determination has been performed, via the communicating unit 23. On the other hand, if the data packet cannot be transmitted, the processing unit 22 does not transmit the data packet. Note that, regardless of whether or not the data packet can be transmitted, the processing unit 22 can cache the object included in the data packet. After caching the object, the processing unit 22 saves, to the CS, not only information indicating the object but also the distributability list information or the non-distributability list information included in the data packet. Thus, when the processing unit 22 receives an interest packet that requests the object cached in this transfer device via the communicating unit 23, and transmits the cached object without transferring the interest packet to the server device 1, the processing unit 22 can determine whether or not the object can be transmitted. Note that, if the object cached in the transfer device cannot be transmitted, the transfer device simply discards the received interest packet.

In the fourth embodiment and the fifth embodiment, the processing unit 22, upon receiving a broadcast message via the communicating unit 23, determines whether to set the interface that has received the broadcast message or the null value in the FIB as an interface to which content included in the broadcast message is to be transferred, based on the identifier of this transfer device and the distributability list information or the non-distributability list information included in the received broadcast message, and updates the FIB in accordance with the determination result. In this case, the processing unit 22 transmits the received broadcast message from an interface other than the interface that has received the broadcast message. Otherwise, the processing unit 22, upon receiving a broadcast message, determines whether or not to transmit the received broadcast message to each of the transfer devices that are connected to interfaces other than the interface that has received the broadcast message, based on the identifiers of these connected transfer devices and the distributability list information or the non-distributable-network included in the received broadcast message. Then, the received broadcast message is transmitted based on the determination result.

Note that the server device 1 and the transfer device according to the present invention can be realized by programs that cause a computer to operate the server device 1 and the transfer device. These computer programs are stored in a non-transitory, computer-readable storage medium, or can be distributed via a network.

The present invention is not limited to the above embodiments and various changes and modifications can be made within the spirit and scope of the present invention. Therefore, to apprise the public of the scope of the present invention, the following claims are made.

The invention claimed is:

1. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
transfer a first request packet received from a first transfer device different from the transfer device;
determine, if a data packet including content and list information is received as a response to the first request packet, whether or not the content can be transmitted to the first transfer device, based on an identifier of the first transfer device, and on the list information; and
transmit the data packet to the first transfer device, if the content can be transmitted,
wherein an identifier of each transfer device of the plurality of transfer devices in the content distribution system is represented by a plurality of bits, and the list information included in the data packet is generated by a bitwise logical operation of the identifier of each transfer device to which the content included in the data packet can be transmitted, of the plurality of transfer devices in the content distribution system, and
wherein, in the identifier of each transfer device of the plurality of transfer devices in the content distribution system, only one bit takes a first value, and each of remaining bits takes a second value that differs from the first value, and
if, as a result of a bitwise logical operation of the list information and the identifier of the first transfer device, all of the plurality of bits take a same value, the content cannot be transmitted to the first transfer device.

2. The transfer device according to claim 1, wherein, when executed, the instructions further cause the processor circuit to at least:
determine, if the data packet including content and the list information is received as the response to the first request packet, whether or not to cache the content, and cache the content in association with the list information if it is determined that the content is to be cached,
wherein, if a second request packet requesting the content to be cached is received from a second transfer device different from the transfer device, it is determined whether or not the content can be transmitted to the second transfer device, based on an identifier of the second transfer device, and on the list information associated with the content, and
it is determined that the content can be transmitted, transmitting a data packet including the content cached and the list information associated with the content to the second transfer device.

3. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
transfer a first request packet received from a first transfer device different from the transfer device;
determine, if a data packet including content and list information is received as a response to the first request packet, whether or not the content can be transmitted to the first transfer device, based on an identifier of the first transfer device, and on the list information; and
transmit the data packet to the first transfer device, if it is determined that the content can be transmitted,
wherein an identifier of each transfer device of the plurality of transfer devices in the content distribution system is represented by a plurality of bits, and the list information included in the data packet is generated by a bitwise logical operation of the identifier of each transfer device to which the content included in the data packet cannot be transmitted, of the plurality of transfer devices in the content distribution system, and
wherein, in the identifier of each transfer device of the plurality of transfer devices in the content distribution system, only one bit takes a first value, and each of remaining bits takes a second value that differs from the first value, and
if, as a result of a bitwise logical operation of the list information and the identifier of the first transfer device, all of the plurality of bits take a same value, it is determined that the content can be transmitted to the first transfer device.

4. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
transfer a first request packet received from a first transfer device different from the transfer device;
determine, if a data packet including content and list information is received as a response to the first request packet, whether or not the content can be transmitted to the first transfer device, based on an identifier of the first transfer device, and on the list information; and
transmit the data packet to the first transfer device, if it is determined that the content can be transmitted,
wherein an identifier of each transfer device of the plurality of transfer devices in the content distribution system is represented by a plurality of bits, and the list information included in the data packet is generated by a bitwise logical operation of the identifier of each transfer device to which the content included in the data packet can be transmitted, of the plurality of transfer devices in the content distribution system, and
wherein, of the plurality of bits in the identifier of each transfer device of the plurality of transfer devices in the content distribution system, a predetermined number or less of bits takes a first value, and each of remaining bits takes a second value that differs from the first value, and
if a result of a bitwise logical operation of the list information and the identifier of the first transfer device coincides with the identifier of the first transfer device, it is determined that the content can be transmitted to the first transfer device.

5. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
transfer a first request packet received from a first transfer device different from the transfer device;
determine, if a data packet including content and list information is received as a response to the first request packet, whether or not the content can be transmitted to the first transfer device, based on an identifier of the first transfer device, and on the list information; and
transmit the data packet to the first transfer device, if it is determined that the content can be transmitted,
wherein an identifier of each transfer device of the plurality of transfer devices in the content distribution system is represented by a plurality of bits, and the list information included in the data packet is generated by a bitwise logical operation of the identifier of each transfer device to which the content included in the data packet cannot be transmitted, of the plurality of transfer devices in the content distribution system, and
wherein, of the plurality of bits in the identifier of each transfer device of the plurality of transfer devices in the content distribution system, a predetermined number or less of bits take a first value, and each of remaining bits takes a second value that differs from the first value, and
if a result of a bitwise logical operation of the list information and the identifier of the first transfer device coincides with the identifier of the first transfer device, it is determined that the content cannot be transmitted to the first transfer device.

6. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
determine, if a broadcast message indicating content and including list information is received, whether or not to transfer the broadcast message to a first transfer device different from the transfer device, based on an identifier of the first transfer device and the list information; and
transfer the broadcast message to the first transfer device if it is determined that the broadcast message is to be transferred, and not transferring the broadcast message to the first transfer device if it is determined that the broadcast message is not to be transferred,
wherein an identifier of each transfer device of the plurality of transfer devices in the content distribution system is represented by a plurality of bits, and the list information included in the broadcast message is generated by a bitwise logical operation of the identifier of each transfer device to which the content indicated by the broadcast message can be transmitted, of the plurality of transfer devices in the content distribution system, and
wherein, in the identifier of each transfer device of the plurality of transfer devices in the content distribution system, only one bit takes a first value, and each of remaining bits takes a second value that differs from the first value, and
if, as a result of a bitwise logical operation of the list information included in the broadcast message and the identifier of the first transfer device, all of the plurality of bits take a same value, it is determined that the broadcast message is not to be transferred to the first transfer device.

7. A transfer device for a content distribution system including a plurality of transfer devices, in which a request packet including a content name of content that is requested to be distributed is transferred based on the content name, the transfer device comprising:
at least one processor circuit with a memory comprising instructions, that when executed by the processor circuit, causes the processor circuit to at least:
determine, if a broadcast message indicating content and including list information is received, whether or not to transfer the broadcast message to a first transfer device different from the transfer device, based on an identifier of the first transfer device and the list information; and
transfer the broadcast message to the first transfer device if it is determined that the broadcast message is to be transferred, and not transferring the broadcast message to the first transfer device if the determination unit determines that the broadcast message is not to be transferred, wherein an identifier of each transfer device of the plurality of transfer devices in the content distribution system is represented by a plurality of bits, and the list information included in the broadcast message is generated by a bitwise logical operation of the identifier of each transfer device to which the content indicated by the broadcast message cannot be transmitted, of the plurality of transfer devices in the content distribution system, and wherein, in the identifier of each transfer device of the plurality of transfer devices in the content distribution system, only one bit takes a first value, and each of remaining bits takes a second value that differs from the first value, and if, as a result of a bitwise logical operation of the list information included in the broadcast message and the identifier of the first transfer device, all of the plurality of bits take a same value, it is determined that the broadcast message is to be transferred to the first transfer device.

8. The transfer device according to claim 1, wherein the plurality of transfer devices in the content distribution system are grouped, and transfer devices included in the same group are assigned a same identifier.

9. A non-transitory computer readable storage medium including a program for causing a computer to function as the transfer device according to claim 1.

* * * * *